United States Patent
Sun et al.

(10) Patent No.: US 11,022,759 B2
(45) Date of Patent: Jun. 1, 2021

(54) PLUGGABLE MINIATURE OPTICAL PASSIVE DEVICE

(71) Applicant: Molex, LLC, Lisle, IL (US)

(72) Inventors: Xiansheng Sun, Zhuhai (CN); Xuan Zhang, Zhuhai (CN); Nongcun Yu, Zhuhai (CN); Jianlong Huang, Zhuhai (CN)

(73) Assignee: Molex, LLC, Lisle, IL (US)

( * ) Notice: Subject to any disclaimer, the term of this patent is extended or adjusted under 35 U.S.C. 154(b) by 594 days.

(21) Appl. No.: 15/754,929

(22) PCT Filed: Aug. 25, 2016

(86) PCT No.: PCT/CN2016/096691
§ 371 (c)(1),
(2) Date: Feb. 23, 2018

(87) PCT Pub. No.: WO2017/032328
PCT Pub. Date: Mar. 2, 2017

(65) Prior Publication Data
US 2020/0241210 A1    Jul. 30, 2020

(30) Foreign Application Priority Data
Aug. 25, 2015    (CN) .......................... 201510526702.8

(51) Int. Cl.
G02B 6/38         (2006.01)
G02B 6/293        (2006.01)
G02B 6/32         (2006.01)

(52) U.S. Cl.
CPC ............. G02B 6/381 (2013.01); G02B 6/293 (2013.01); G02B 6/32 (2013.01)

(58) Field of Classification Search
CPC .......... G02B 6/381; G02B 6/293; G02B 6/32
(Continued)

(56) References Cited

U.S. PATENT DOCUMENTS

| | | | |
|---|---|---|---|
| 2002/0110322 A1* | 8/2002 | Brun .................. | G02B 6/29395 385/33 |
| 2005/0094946 A1* | 5/2005 | Camporeale ......... | G02B 6/3885 385/80 |
| 2016/0047995 A1* | 2/2016 | Ware ....................... | G02B 6/46 385/60 |

FOREIGN PATENT DOCUMENTS

| CN | 201133948 Y | 10/2008 |
|---|---|---|
| CN | 201298091 Y | 8/2009 |

(Continued)

Primary Examiner — Jerry M Blevins

(57) ABSTRACT

A pluggable miniature optical passive device comprises a casing (30), an optical device (40) is mounted in the casing (30), a first end of the optical device (40) is provided with a first ceramic ferrule (43). At least one fiber core (432) is provided in the first ceramic ferrule (43), a first end (41) of the first ceramic ferrule (43) extends out of the casing (30). A second end (42) of the first ceramic ferrule (43) is positioned in the optical device (40), and the second end (42) of the first ceramic ferrule (43) is coated with an antireflection film, a lens (45) is provided close to the second end (42) of the first ceramic ferrule (43), the lens (45) is positioned in the optical device (40). At least one optical fiber is further provided in the optical device (40), a first end of the optical fiber is provided at a side close to the lens (45) and away from the first ceramic ferrule (43), a light beam incident in the optical fiber of the optical device (40) via the ceramic ferrule (43) and the lens (45). The pluggable miniature optical passive device has a small volume, and low manufacturing cost and long service life.

20 Claims, 6 Drawing Sheets

(58) Field of Classification Search
USPC .......................................................... 385/60
See application file for complete search history.

(56) References Cited

FOREIGN PATENT DOCUMENTS

| | | |
|---|---|---|
| CN | 201331599 Y | 10/2009 |
| CN | 201804130 U | 4/2011 |
| CN | 102841411 A | 12/2012 |
| CN | 105044848 A | 11/2015 |
| JP | 2006-154242 A | 6/2006 |

\* cited by examiner

PLUGGABLE MINIATURE OPTICAL PASSIVE DEVICE

RELATED APPLICATIONS

This application claims priority to PCT Application No. PCT/CN2016/096691, filed Aug. 25, 2016, which claims priority to Chinese Application No. 201510526702.8, filed Aug. 25, 2015, which is incorporated herein by reference in its entirety.

TECHNICAL FIELD

The present disclosure relates to an optical device for optical fiber communication system, specifically relates to a pluggable miniature optical passive device.

BACKGROUND ART

With development of optical fiber communication technology, wavelength division multiplexing technology as a multiplexing technology in optical communication field has become a main stream technology of optical layer network at present. The wavelength division multiplexing technology mainly uses a wavelength division multiplexer to divide an optical signal into multi-beam signals, therefore, the wavelength division multiplexer is an important optical device to realize the wavelength division multiplexing technology.

With development of high density information communication technology, such as big data, cloud computing and the like, in recent years, the wavelength division multiplexer is also applied into building of a data center, therefore, the data center has a large amount of requirements on small-size, miniaturized, plug-and-play, wavelength division multiplexers for expanding between cabinets. However, at present, optical passive devices or modules in optical communication industry are mainly separated module or cascaded module, on one hand, it is not convenient to connect with a jumper directly, on the other hand, because sizes of the devices are relatively large, they cannot meet requirement of the data center on the devices for small-size and miniaturization. At present, the requirements of the data center on the optical passive device, such as wavelength division multiplexing and the like, comprises a size of the optical passive device needs to be substantially consistent with or the same with the conventional optical jumper, only meeting this condition, can exposed lengths of all the tails of the jumpers on the panel of the cabinet be assured to be the same so as to facilitate wiring thereof.

In order to resolve above problem, people develops a pluggable optical fiber jumper as shown in FIG. 1, the optical fiber jumper has a pluggable miniature wavelength division multiplexer 10 for dividing optical signal into two parts, the divided two parts of the optical signal are respectively incident into pluggable optical passive devices 12, 13.

Referring to FIG. 2 and FIG. 3, the pluggable miniature wavelength division multiplexer 10 has a casing 15, the casing 15 comprises a connector plug outer housing 16, a jumper assembly 17, a packaging pipe 18 and a protective tail sleeve 19, a ceramic ferrule 21 and a wavelength division multiplexer 24 are packaged in the casing 15. Most part of the ceramic ferrule 21 is enveloped by the connector plug outer housing 16, and an end of the ceramic ferrule 21 extends out of the connector plug outer housing 16, the other end is adjacent to a stopping piece 22. The ceramic ferrule 21 and the wavelength division multiplexer 24 are connected by a bare optical fiber 23 therebetween, the bare optical fiber 23 is connected to an end of the wavelength division multiplexer 24. A head of an optical fiber needs to be provided in the wavelength division multiplexer 24, the head of the optical fiber is positioned close to an end of the bare optical fiber 23. The other end of the wavelength division multiplexer 24 is connected with two optical fibers 25, 26, the optical fibers 25, 26 pass through the protective tail sleeve 19.

However, such a pluggable miniature wavelength division multiplexer 10 has the following problems: first, a size of an outer profile of the device is large, and is larger than 50% of a length size of the industrial standard jumper, when used, there is a problem that lengths of jumper heads exposed on the panel of the cabinet will not be consistent in height. Because a tail portion of such a device is exposed too long and may be easily hit and damaged, at the same time because arm of force becomes longer, the ability to bear lateral pulling is lowered.

Secondly, because such a device becomes longer relative to the size of the industrial standard jumper, after such as device is inserted onto the panel, an optical cable at the tail portion will generate lateral pulling due to action of gravity, because the device becomes longer, arm of force for lateral pulling becomes longer, the device is hard to conform with the requirement on the optical cable jumper for lateral pulling in the IEC specification, service life of the product is shorter.

Next, when the ceramic ferrule 21 of such a device is fixed, because of structural reason, a self-adaptive spring structure for buffering is canceled, which will result in that, in the process of inserting in and pulling out, only a spring in a device, which is matched with the pluggable miniature wavelength division multiplexer 10, at the other side, buffers, buffering effect becomes poor, which results in impact force in inserting in and pulling out the device too large and the device is easily damaged, at the same time it is not conformed with the IEC specification.

In addition, the connection between the wavelength division multiplexer 24 and the ceramic ferrule 21 in the device is realized by using a fragile bare optical fiber 23 of 125 micrometer, when the bare optical fiber 23 is added onto the ceramic ferrule 21 at the front end, it needs to manufacture an independent optical passive device in advance, and then a mono-line transmission end of the device is performed for fiber stripping and is inserted into the ceramic ferrule 21, because the above operation is complex and the optical fiber of glass quite easily fractures in fiber striping, which affects qualified rate of the product. At the same time, the finished device also will slightly displace in impacting and vibrating process, which results in the bare optical fiber 23 to be damaged and fracture.

Finally, because such a pluggable miniature wavelength division multiplexer 10 uses more metal pipes or plastic pipes, thereby increasing manufacturing cost of the device.

SUMMARY

A main object of the present disclosure is to provide a pluggable miniature optical passive device which is small in size and can match with a length size of the industrial standard jumper.

Another object of the present disclosure is to provide a pluggable miniature optical passive device which is not easily damaged and has lower manufacturing cost.

In order to attain the above main object, a pluggable miniature optical passive device provided by the present disclosure comprises: a casing, an optical device is mounted in the casing, a first end of the optical device is provided with a first ceramic ferrule, at least one fiber core is provided in the first ceramic ferrule, a first end of the first ceramic ferrule extends out of the casing, a second end of the first ceramic ferrule is positioned in the optical device, and the second end of the first ceramic ferrule is coated with an antireflection film, a lens is provided close to the second end of the first ceramic ferrule, the lens is positioned in the optical device; at least one optical fiber is further provided in the optical device, a first end of the optical fiber is provided at a side close to the lens and away from the first ceramic ferrule, a light beam is incident in the optical fiber of the optical device via the ceramic ferrule and the lens.

As can be seen from the above solution, the pluggable miniature optical passive device of the present disclosure makes the ceramic ferrule and the lens packaged in the same optical device, and the second end of the ceramic ferrule is provided with the antireflection film, and then makes the second end of the ceramic ferrule and the lens provided together close to each other, so that it is not necessary to provide a bare optical fiber between the ceramic ferrule and the optical device, which may make the size of the pluggable miniature optical passive device very small, can match with the length size of the industrial standard jumper, and after the bare optical fiber is cancelled, it is also not necessary to use more metal pipes or plastic pipes, which makes manufacturing cost lower.

In addition, because no bare optical fiber is provided in the pluggable miniature optical passive device, in the process of inserting in and pulling out, it does not occur fracture of the bare optical fiber, which assures qualified rate of the product, also assures service life of the product.

One preferable solution is: a first stopping piece is provided at a position close to the first end of the optical device, and a middle portion of the stopping piece is provided with a penetrating hole, the first ceramic ferrule passes through the penetrating hole. And, a spring is provided in the casing, a first end of the spring abuts against an end face of the stopping piece, an inner wall of the casing is further provided with a shoulder portion, a second end of the spring abuts against the shoulder portion.

As can be seen from the above, in the process of inserting in and pulling out the pluggable miniature optical passive device, impact force on the optical device is buffered by the spring, which can avoid the optical device being easily damaged due to too large subjected impact force, so that service life of the pluggable miniature optical passive device is elongated.

A further solution is: a second end of the casing is provided with a second ceramic ferrule, the second ceramic ferrule is positioned in a second end of the optical device, and the second end of the optical device is provided with a second stopping piece.

It can be seen that, the two ceramic ferrules are provided in the casing so as to form double-joint device, which may make the pluggable miniature optical passive device directly connected to two different optical apparatuses, meet different connection requirements of the different optical apparatuses.

More further solution is: the casing comprises a first connector plug outer housing enveloping the first ceramic ferrule, an adapter assembly enveloping the optical device and a second connector plug outer housing enveloping the second ceramic ferrule.

As can be seen from this, using two different connector plug outer housing to respectively envelope two ceramic ferrules, the outer housings at the two ends of the pluggable miniature optical passive device have the same structure, which is convenient for the pluggable miniature optical passive device to realize double-direction connection.

A selectable solution is: the casing comprises a first connector plug outer housing enveloping the first ceramic ferrule, an adapter assembly enveloping a middle region of the optical device and a packaging cap enveloping the second end of the optical device, an end portion of the second ceramic ferrule extends out of the packaging cap and are enveloped in a flange.

It can be seen that, the flange is provided at the end portion of the pluggable miniature optical passive device, which may meet mounting requirement of the pluggable miniature optical passive device in special environment, and make use environments of the pluggable miniature optical passive device more wide.

More further solution is: the ceramic ferrule has one or more fiber core therein. When two or three fiber cores are in the ceramic ferrule, it may form a wavelength division multiplexer with various specifications, such as 2×4, 3×3 and the like, a structure of the product is more flexible.

Hereinafter, the present disclosure will be described in combination with figures and embodiments.

DETAILED DESCRIPTION OF THE PREFERRED EMBODIMENTS

A pluggable miniature optical passive device of the present disclosure is applied in an optical fiber system, may be various optical device, such as a wavelength division multiplexer, an optical isolator, an optical circulator, an optical beam splitter and the like.

Figure 1:
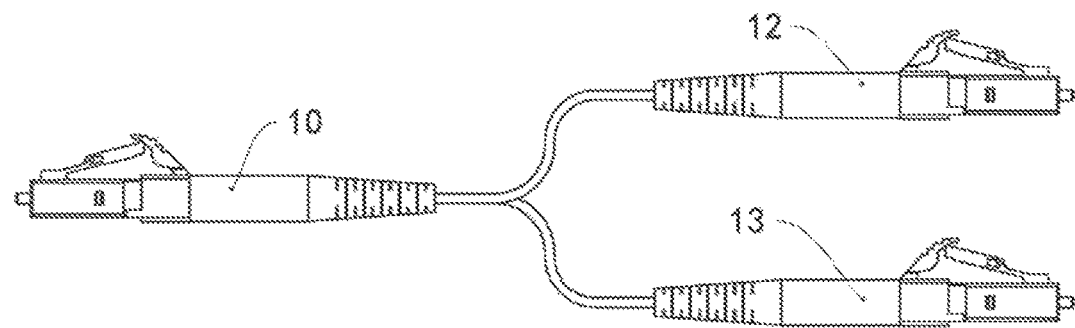
FIG. 1 is a structural view of a pluggable optical fiber jumper in prior art.
Figure 2:
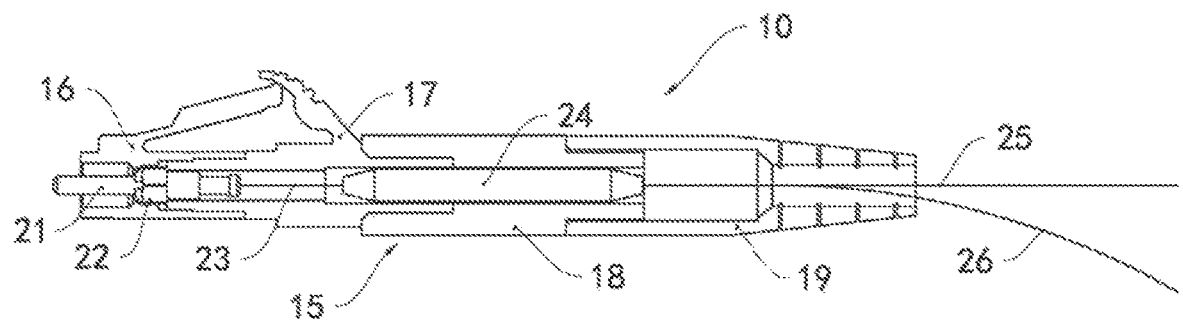
FIG. 2 is an internal structural view of a pluggable miniature wavelength division multiplexer in prior art.
Figure 3:
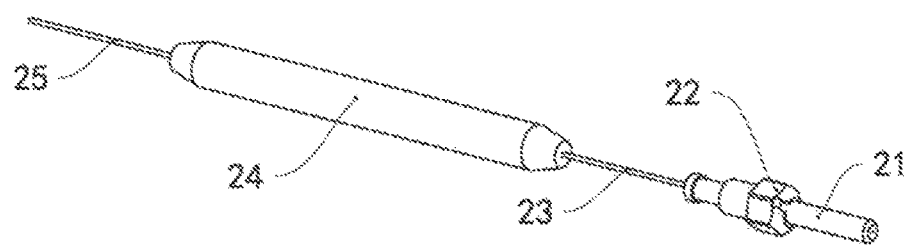
FIG. 3 is a structural view of an optical device and a head of an optical fiber of the pluggable miniature wavelength division multiplexer in prior art.
Figure 4:
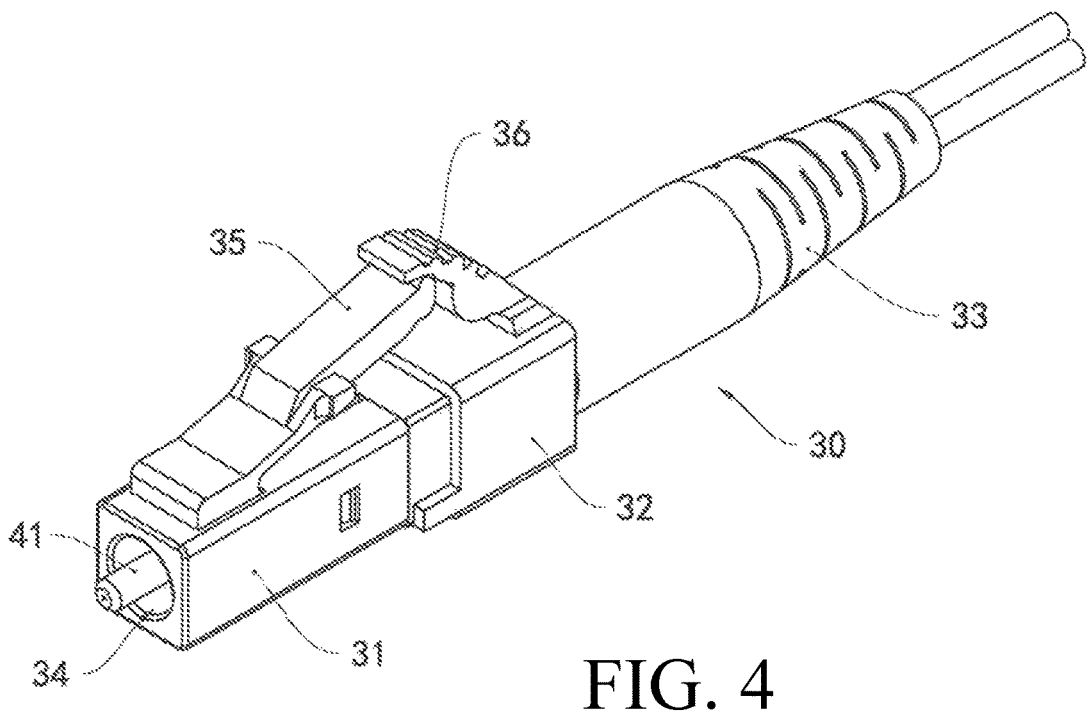
FIG. 4 is a structural view a first embodiment of the present disclosure.

Referring to FIG. 4, a pluggable miniature optical passive device of the present embodiment may act as a wavelength division multiplexer, and has a casing 30, the casing 30 comprises a connector receptacle outer housing 31, a jumper assembly 32 and a protective tail sleeve 33, a middle portion of the connector receptacle outer housing 31 is provided with a through hole 34, the through hole 34 passes through two ends of the connector receptacle outer housing 31, and an elastic piece 35 is provided on the connector receptacle outer housing 31. A part of the jumper assembly 32 is inserted into the connector receptacle outer housing 31, so as to realize secure connection between the jumper assembly 32 and the connector receptacle outer housing 31. A stopping member 36 is provided on an outer wall of the jumper assembly 32, an end portion of the elastic piece 35 abuts against the stopping member 36 from below. The protective tail sleeve 33 is positioned at a side of the jumper assembly 32 away from the connector receptacle outer housing 31, and the protective tail sleeve 33 and the jumper assembly 32 are securely connected together.

Figure 5:
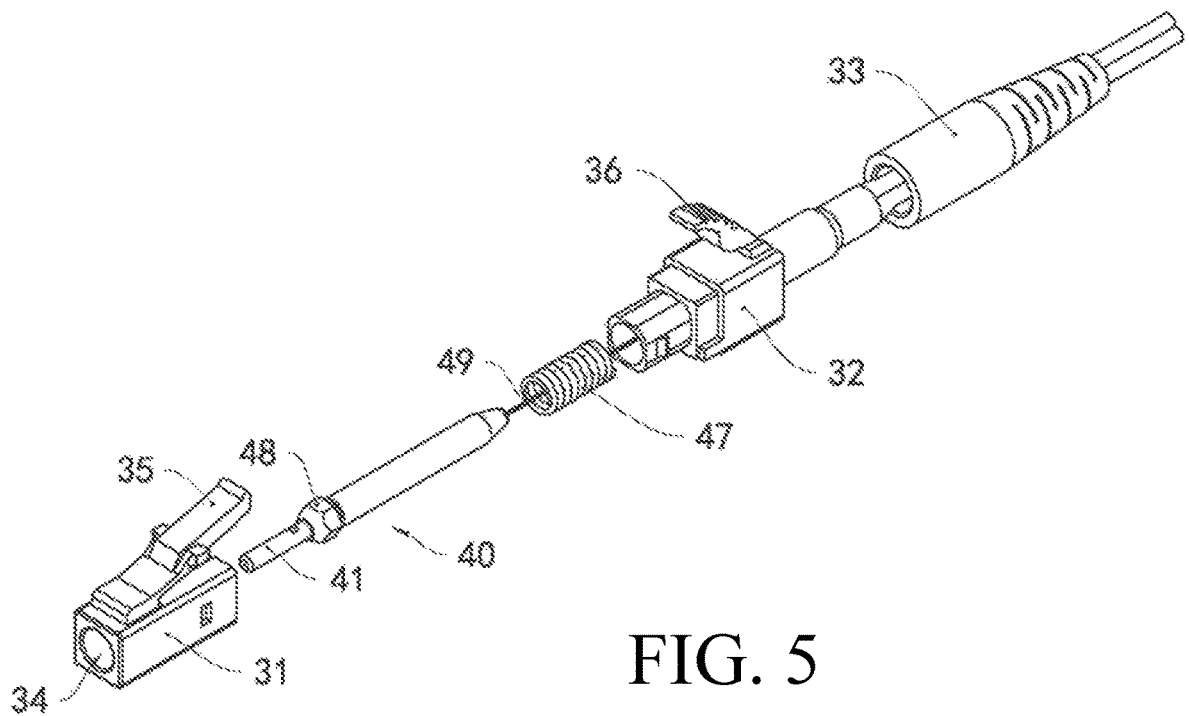
FIG. 5 is a structural exploded view of the first embodiment of the present disclosure.
Figure 6:
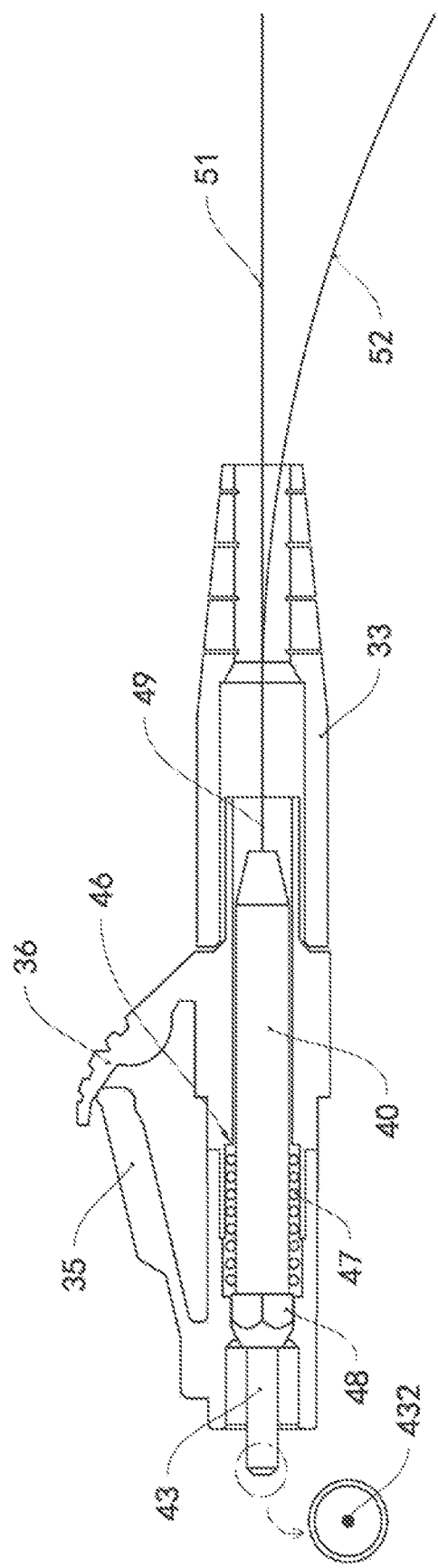
FIG. 6 is an internal structural view of the first embodiment of the present disclosure.
Figure 7:
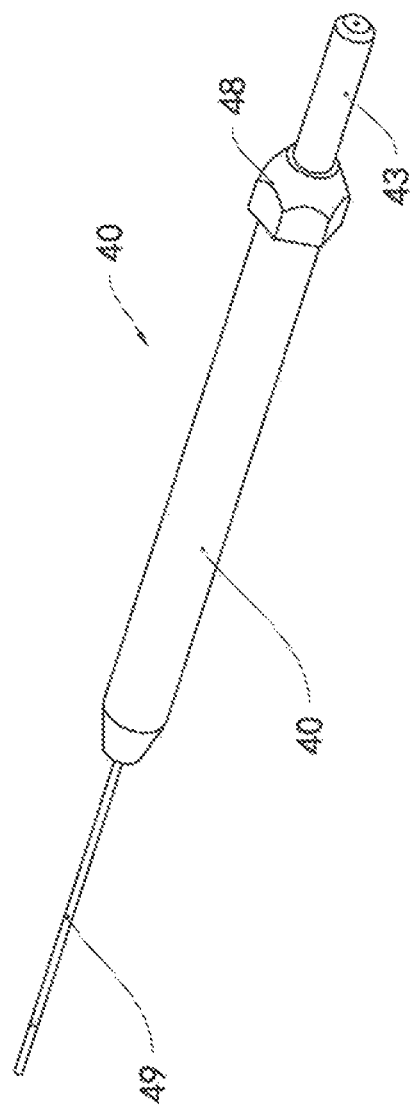
FIG. 7 is a structural view of an optical device of the first embodiment of the present disclosure.
Figure 8:
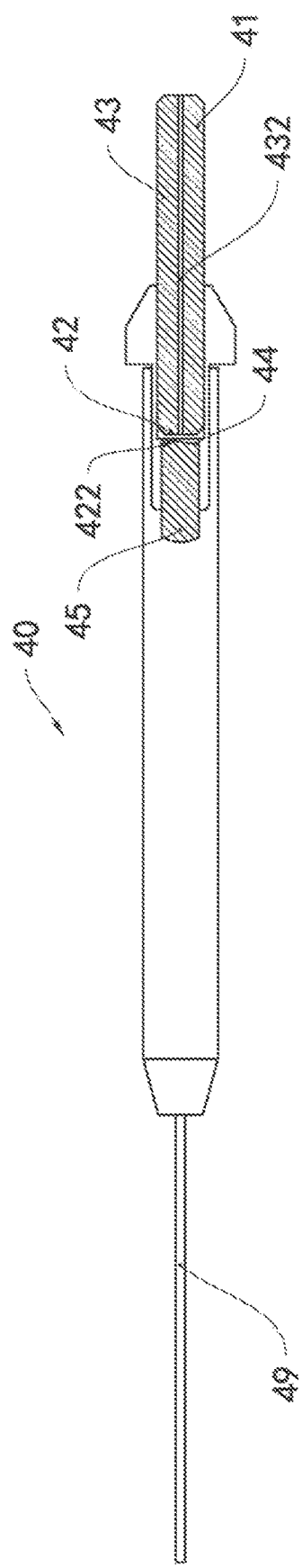
FIG. 8 is a cross sectional view of the optical device of the first embodiment of the present disclosure.

Referring to FIG. 5 and FIG. 6, a ceramic ferrule 43 and a wavelength division multiplexer 40 as an optical device and a spring 47 are mounted in the casing 30, the ceramic ferrule 43 is provided with a fiber core 432 therein, a first end 41 (or referred to as a front end) of the ceramic ferrule 43 extends forwardly out of the casing 30, and most part of the ceramic ferrule 43 is positioned in the through hole 34 of the connector receptacle outer housing 31. As shown in FIG. 7 and FIG. 8, a second end 42 of the ceramic ferrule 43 is inserted into a first end of the wavelength division multiplexer 40, the first end of the wavelength division multiplexer 40 is further provided with a lens 45, the second end 42 of the ceramic ferrule 43 is close to an end face of the lens 45 and positioned in front, a gap 422 is provided between the second end 42 of the ceramic ferrule 43 and the lens 45, a size of the gap 422 may be adjusted according to requirement on optical property, generally is between 0.15 millimeter and 0.2 millimeter. Preferably, the second end 42 of the ceramic ferrule 43 is coated with an antireflection film, particularly a second end of the fiber core 432 is coated with an antireflection film so as to promote light transmission of the fiber core 432, which thus may reduce loss of a light beam, and the end face 44 of the lens 45 close to the ceramic ferrule 43 is an oblique surface, that is the end face 44 of the lens 45 close to the ceramic ferrule 43 is oblique relative to an end face of the second end 42 of the ceramic ferrule 43, which thus may prevent reflected light from the end face 44 of the lens 45 reversely returning to the fiber core 432. The lens 45 may act as an optical fiber collimator for collimating a light beam and allowing the light beam to be incident into the optical fiber of the wavelength division multiplexer 40.

An optical fiber is provided in the wavelength division multiplexer 40, an end of the optical fiber is close to an end face of the lens 45, the light beam may be incident into the optical fiber of the wavelength division multiplexer 40 via the ceramic ferrule 43 and the lens 45. And, the end face of the lens 45 away from the ceramic ferrule 43 may coated with a wavelength division multiplexing film. Certainly, if the optical device 40 is not a wavelength division multiplexer, it is not necessary to coat the lens 45 with the wavelength division multiplexing film.

A stopping piece 48 is provided at an outer side of the first end of the wavelength division multiplexer 40, after the wavelength division multiplexer 40 is mounted to the casing 30, the stopping piece 48 is enveloped in the connector receptacle outer housing 31. As can be seen from FIG. 8, a middle portion of the stopping piece 48 is provided with a penetrating hole, the second end 42 of the ceramic ferrule 43 passes through the penetrating hole. And, an inner wall of the jumper assembly 32 is provided with a shoulder portion 46, the spring 47 is sheathed on an outer periphery of the first end of the wavelength division multiplexer 40, and two ends of the spring 47 respectively abut against an end face of the stopping piece 48 and the shoulder portion 46. A second end of the wavelength division multiplexer 40 is connected with an optical fiber 49, the optical fiber 49 is enveloped in the protective tail sleeve 33, and the optical fiber 49 is split into two optical fibers 51, 52 which extend out of the protective tail sleeve 33.

Referring to FIG. 6, as can be seen from the cross section of the ceramic ferrule 43, the ceramic ferrule 43 is provided with one fiber core 432 therein, therefore the light beam is incident from the ceramic ferrule 43 and then is divided into two light beams by the wavelength division multiplexer 40 and respectively emit from the optical fibers 51, 52, realize beam splitting of the light beam.

In the present embodiment, the second end 42 of the ceramic ferrule 43 and the stopping piece 48 are enveloped in the connector receptacle outer housing 31, most part of the wavelength division multiplexer 40 is enveloped in the jumper assembly 32, the spring 47 is enveloped in the connector plug outer housing 31 and the jumper assembly 32, and the second end of the wavelength division multiplexer 49 and the optical fiber 49 are enveloped in the protective tail sleeve 33.

When the wavelength division multiplexer 40 is manufactured, it needs to coat the second end 42 of the ceramic ferrule 43 with an antireflection film, and in the case that the lens 45 is mounted in the wavelength division multiplexer 40, the ceramic ferrule 43 is inserted into the wavelength division multiplexer 40. After the pluggable miniature optical passive device is packaged, the first end 41 of the ceramic ferrule 43 is polished, thereby obtaining a finished product.

Because the pluggable miniature optical passive device uses the ceramic ferrule 43 acts as a shared member for a jumper ferrule and a head of the optical fiber of the wavelength division multiplexer 40, therefore it is not necessary to use a bare optical fiber to connect the jumper ferrule and the wavelength division multiplexer 40 in the pluggable miniature optical passive device, a length of the pluggable miniature optical passive device is shorter, can match with a length size of the industrial standard jumper, meet requirement of industry on the pluggable miniature optical passive device for small-size and miniature of volume. And, because the pluggable miniature optical passive device is not provided with the bare optical fiber, a manufacturing process of the device is simple, and will not have a problem that the service life of the device is shorter due to fracture of the bare optical fiber. In addition, because the size of the device is smaller, all the materials for manufacturing the casing 30 are less, which may reduce manufacturing cost and manufacturing difficulty of the device.

Meanwhile, the pluggable miniature optical passive device is provided with the stopping piece 48 and the spring 49 therein, in the process of inserting in and pulling out the device, it may effectively buffer damage of impact force to the optical device, such as the wavelength division multiplexer and the like, at the same time, avoid transversal matching in the process of aligning the optical fiber, may elongate the service life of the device.

Figure 9:
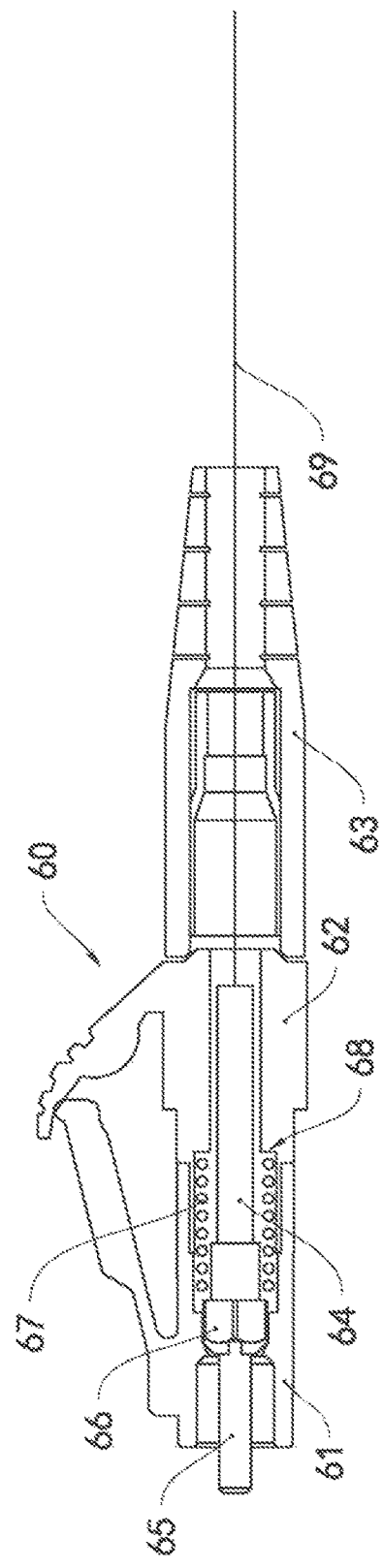
FIG. 9 is an internal structural view of a second embodiment of the present disclosure.

Referring to FIG. 9, a pluggable miniature optical passive device of the present embodiment may be a device realizing functions, such as optical isolation and like, and has a casing 60, the casing 60 of the present embodiment comprises a connector receptacle outer housing 61, a jumper assembly 62 and a protective tail sleeve 63 which are sequentially connected, a ceramic ferrule 65 and an optical device 64 are mounted in the casing 60, a first end of the ceramic ferrule 65 extends out of the connector receptacle outer housing 61, a second end is positioned in the optical device 64, and an end face of the second end is coated with an antireflection film. A lens is provided in the optical device 64, the lens is positioned at a side where the second end of the ceramic ferrule 65 is present.

A first end of the optical device 64 is provided with a stopping piece 66, and the first end of the optical device 64 is sheathed with a spring 67, an inner wall of the jumper assembly 62 is provided with a shoulder portion 68, two ends of the spring 67 respectively abut against an end face of the stopping piece 66 and the shoulder portion 68. Therefore, in inserting in and pulling out the pluggable miniature optical passive device, the spring 67 may buffer impact force for the device, avoid damage to the optical device 64.

It is different from the first embodiment in that, only one optical fiber 69 is enveloped in the protective tail sleeve 63 in the present embodiment, that is after a light beam passes through the optical device, the light beam directly emits from one optical fiber 69, therefore the optical device 64 may be an optical device, such as a light attenuator, an optical isolator and the like.

Figure 10:
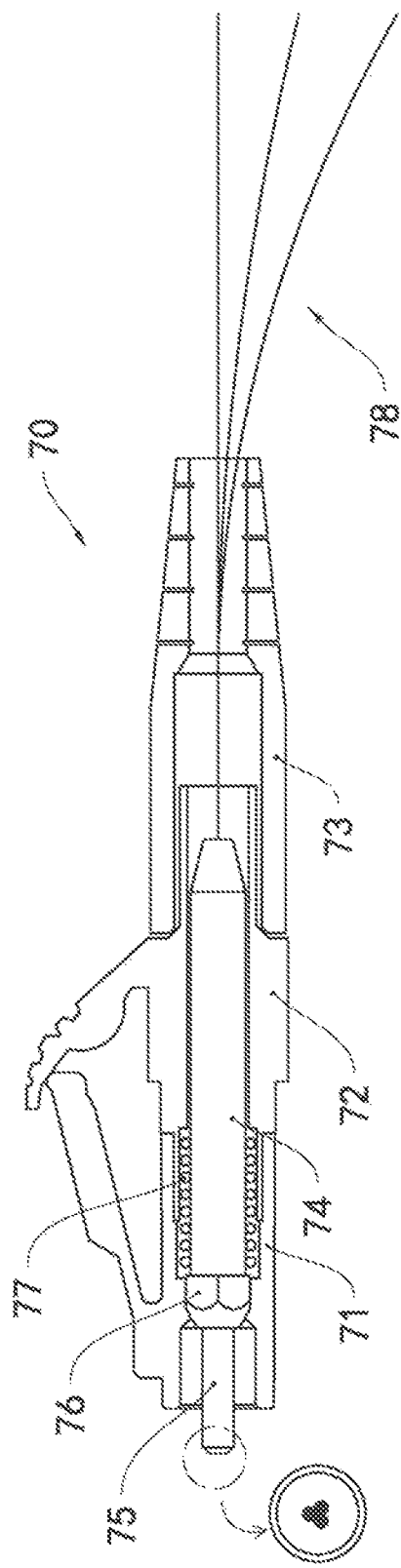
FIG. 10 is an internal structural view of a third embodiment of the present disclosure.

Referring to FIG. 10, a pluggable miniature optical passive device of the present embodiment may be a device realizing the function of wavelength division multiplexing, has a casing 70, the casing 70 comprises a connector receptacle outer housing 71, a jumper assembly 72 and a protective tail sleeve 73 which are sequentially connected, a ceramic ferrule 75 and a wavelength division multiplexer 74 are mounted in the casing 70, a first end of the ceramic ferrule 75 extends out of the connector receptacle outer housing 71, a second end is positioned in the wavelength division multiplexer 74, and an end face of the second end is coated with an antireflection film. A lens acting as an optical fiber collimator is provided in the wavelength division multiplexer 74, the lens is positioned at a side where the second end of the ceramic ferrule 75 is present.

A first end of the wavelength division multiplexer 74 is provided with a stopping piece 76, and the first end of the optical device 74 is sheathed with a spring 77, an inner wall of the jumper assembly 72 is provided with a shoulder portion, a first end of the spring 77 abuts against an end face of the stopping piece 76, a second end abuts against the shoulder portion.

In the present embodiment, three optical fibers 78 are enveloped in the protective tail sleeve 73, and three fiber cores are provided in the ceramic ferrule 75, therefore the pluggable miniature optical passive device of the present embodiment is a 3×3 optical isolator or a 3×3 light attenuator.

Figure 11:
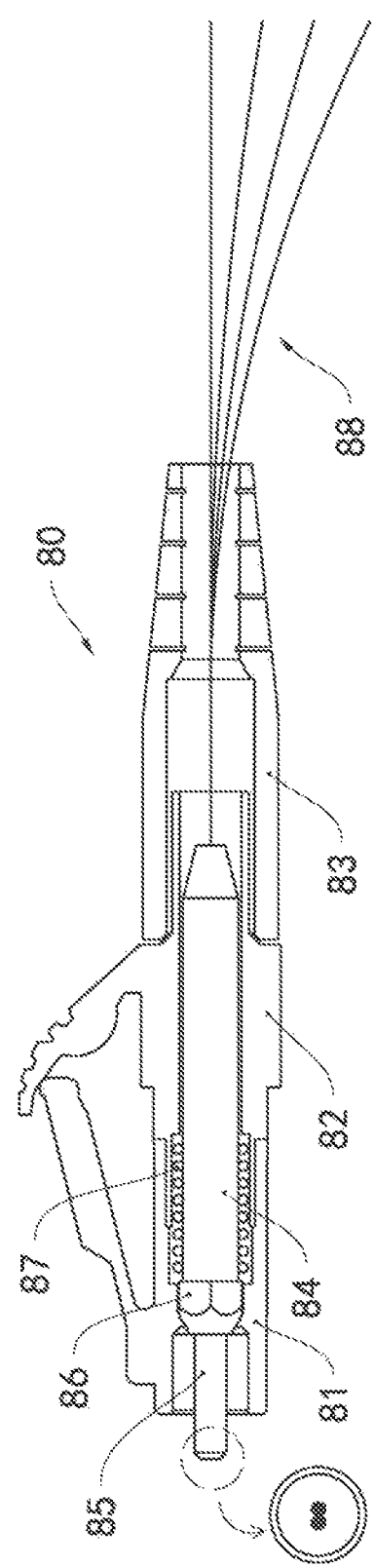
FIG. 11 is an internal structural view of a fourth embodiment of the present disclosure.

Referring to FIG. 11, a pluggable miniature optical passive device of the present embodiment may also be a device realizing function of wavelength division multiplexing, has a casing 80, the casing 80 comprises a connector receptacle outer housing 81, a jumper assembly 82 and a protective tail sleeve 83 which are sequentially connected, a ceramic ferrule 85 and a wavelength division multiplexer 84 are mounted in the casing 80, a first end of the ceramic ferrule 85 extends out of the connector receptacle outer housing 81, a second end is positioned in the wavelength division multiplexer 84, and an end face of the second end is coated with an antireflection film. A lens is provided in the wavelength division multiplexer 84, the lens is positioned at a side where the second end of the ceramic ferrule 85 is present.

A first end of the wavelength division multiplexer 84 is provided with a stopping piece 86, and the first end of the optical device 84 is sheathed with a spring 87, an inner wall of the jumper assembly 82 is provided with a shoulder portion, a first end of the spring 87 abuts against an end face of the stopping piece 86, a second end abuts against the shoulder portion.

In the present embodiment, four optical fibers 88 are enveloped in the protective tail sleeve 83 and two fiber cores are provided in the ceramic ferrule 85, therefore the pluggable miniature optical passive device of the present embodiment is a 2×4 wavelength division multiplexer.

Figure 12:
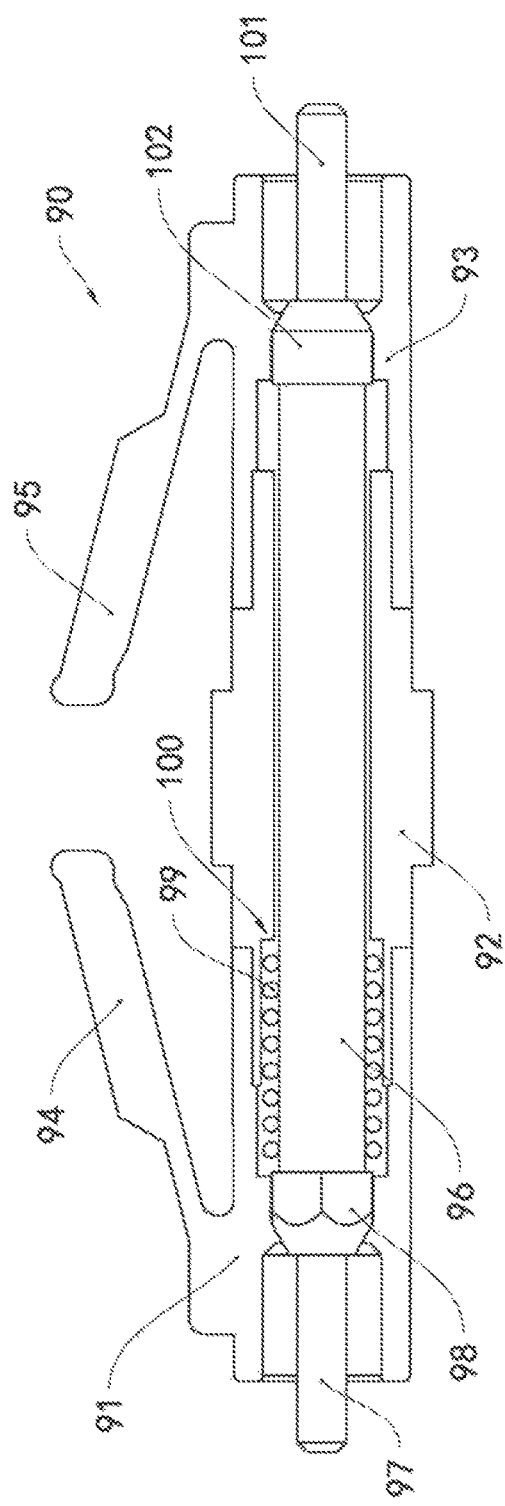
FIG. 12 is an internal structural view of a fifth embodiment of the present disclosure.

Referring to FIG. 12, the present embodiment has a casing 90, the casing 90 comprises a connector receptacle outer housing 91, an adapter assembly 92 and a connector receptacle outer housing 93 which are sequentially connected, an elastic piece 94 is provided on the connector receptacle outer housing 91, another elastic piece 95 is provided on the connector receptacle outer housing 93.

An optical device 96 is mounted in the casing 90, a first end of the optical device 96 is provided with a ceramic ferrule 97, a second end is provided with another ceramic ferrule 101, a first end of the ceramic ferrule 97 extends out of the connector receptacle outer housing 91, a second end is positioned in the optical device 96, and an optical fiber for light path communication and a lens acting as an optical fiber collimator are provided in the optical device 96, the lens is positioned at a side where the second end of the ceramic ferrule 97 is present. The first end of the optical device 96 is provided with a stopping piece 98, and the first end of the optical device 96 is sheathed with a spring 99, and an inner wall of the adapter assembly 92 is provided with a shoulder portion 100, a first end of the spring 99 abuts against an end face of the stopping piece 98, a second end abuts against the shoulder portion 100.

A first end of the ceramic ferrule 101 extends out of the connector receptacle outer housing 93, a second end is positioned in the optical device 96, and another lens is provided at a side where the second end of the ceramic ferrule 101 is present, the second end of the optical device 96 is provided with a stopping piece 102.

In the present embodiment, the first end of the optical device 96, most part of the ceramic ferrule 97 and the stopping piece 98 are enveloped in the connector plug outer housing 91, a middle portion of the optical device 96 is enveloped in the adapter assembly 92, and the second end of the optical device 96, most part of the ceramic ferrule 101 and the stopping piece 102 are enveloped in the connector receptacle outer housing 93. The pluggable miniature optical passive device packaged in such a way may meet use requirement of special environment.

Figure 13:
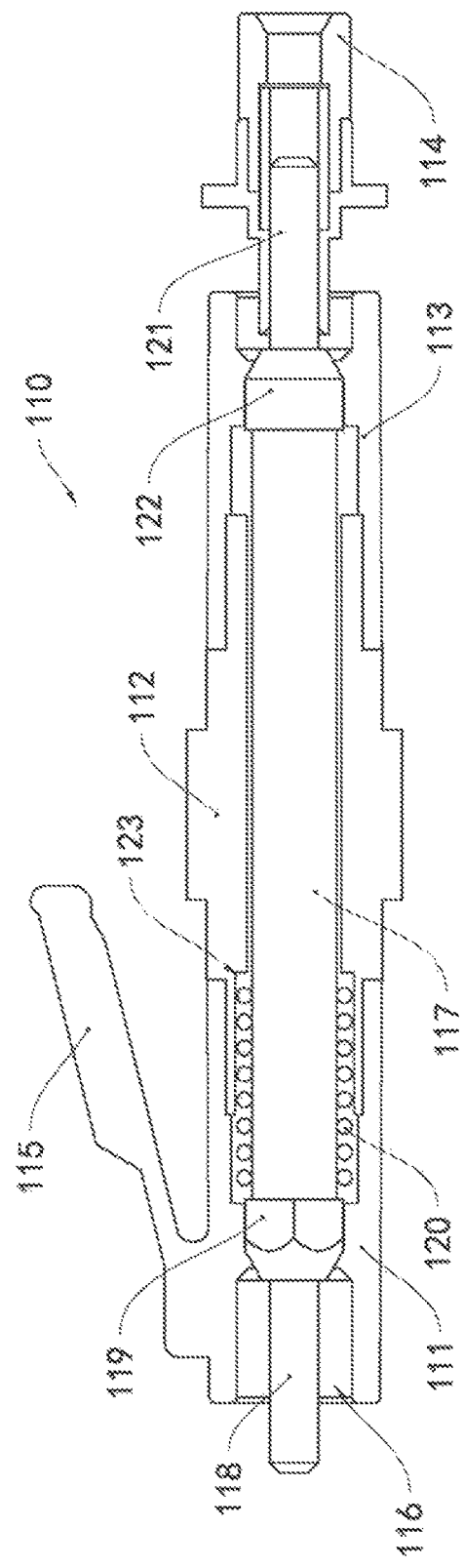
FIG. 13 is an internal structural view of a sixth embodiment of the present disclosure.

Referring to FIG. 13, the present embodiment has a casing 110, the casing 110 comprises a connector receptacle outer housing 111, an adapter assembly 112 and a packaging cap 113 which are sequentially connected, an elastic piece 115 is provided on the connector receptacle outer housing 111, a middle portion of the connector receptacle outer housing 111 is provided with a through hole 116.

An optical device 117 is mounted in the casing 110, a first end of the optical device 117 is provided with a ceramic ferrule 118, a second end is provided with another ceramic ferrule 121, a first end of the ceramic ferrule 118 extends out of the connector receptacle outer housing 111, a second end is positioned in the optical device 117, and an optical fiber for light path communication and a lens acting as an optical fiber collimator are provided in the optical device 117, the lens is positioned at a side where the second end of the ceramic ferrule 118 is present. The first end of the optical device 117 is provided with a stopping piece 119, and the first end of the optical device 117 is sheathed with a spring 120, and an inner wall of the adapter assembly 112 is provided with a shoulder portion 123, a first end of the spring 120 abuts against an end face of the stopping piece 119, a second end abuts against the shoulder portion 123.

A first end of the ceramic ferrule 121 extends out of the connector receptacle outer housing 113, a second end is positioned in the optical device 117, and a lens is provided at a side of the optical device 117 the side is where the second end of the ceramic ferrule 121 is present. The second end of the optical device 117 is provided with a stopping piece 122, and a flange 114 is provided at an outer side of the connector receptacle outer housing 113, the first end of the ceramic ferrule 121 is enveloped in the flange 114.

In the present embodiment, the first end of the optical device 117, most part of the ceramic ferrule 118 and the stopping piece 119 are enveloped in the connector receptacle outer housing 111, a middle portion of the optical device 117 is enveloped in the adapter assembly 112, and the second end of the optical device 117, a small part of the ceramic ferrule 121 and the stopping piece 122 are enveloped in the connector receptacle outer housing 113, the spring 120 is enveloped in the connector receptacle outer housing 111 and the adapter assembly 112.

In the fifth embodiment and the sixth embodiment, the two ends of the pluggable miniature optical passive device each are provided with a ceramic ferrule, which is a double-joint device, the pluggable miniature optical passive device with such a structure may meet structural requirements of a device, such as an optical isolator, a light attenuator and the like.

Certainly, the above solutions are only preferable embodiments of the present disclosure, may further have more variations in practical application, for example, the ceramic ferrule and the lens may be correspondingly changed in shape according to practical requirements of the device; or, the number of the fiber cores in the ceramic ferrule, the number of the optical fibers enveloped in the protective tail sleeve may be also changed according to practical use requirement, these changes all may realize the objects of the present disclosure.

What is claimed is:

1. A pluggable miniature optical passive device, comprising:
    a casing;
    an optical device mounted in the casing, the optical device including:
        a first ceramic ferrule located at a first end of the optical device,
        at least one fiber core located in the first ceramic ferrule,
        a first end of the first ceramic ferrule extending out of the casing,
        a second end of the first ceramic ferrule positioned in the optical device, the second end of the first ceramic ferrule being coated with an antireflection film,
    a lens located in the optical device between the second end of the first ceramic ferrule and at least one optical fiber extending from a second end of the optical device, the lens including a ferrule-side face and an optical-fiber-side face;
    the at least one optical fiber including a first end of the optical fiber located adjacent the optical-fiber-side face of the lens, the first ceramic ferrule, the lens, and the optical fiber each aligned such that, in operation, a light beam is incident in the optical fiber of the optical device via the first ceramic ferrule and the lens; and
    a stopping piece having a penetrating hole, the first ceramic ferrule passing through the stopping piece.

2. The pluggable miniature optical passive device according to claim 1, wherein the ferrule-side face of the lens is oblique relative to an end face of the second end of the first ceramic ferrule.

3. The pluggable miniature optical passive device according to claim 1, further comprising a second ceramic ferrule located at a second end of the casing, the second ceramic ferrule positioned in the second end of the optical device, the second ceramic ferrule passing through a second stopping piece.

4. The pluggable miniature optical passive device according to claim 3, the casing comprising a first connector plug outer housing enveloping the first ceramic ferrule, an adapter assembly enveloping the optical device and a second connector plug outer housing enveloping the second ceramic ferrule.

5. The pluggable miniature optical passive device according to claim 3, the casing comprising a first connector plug outer housing enveloping the first ceramic ferrule, an adapter assembly enveloping a middle region of the optical device and a packaging cap enveloping the second end of the optical device, an end portion of the second ceramic ferrule extending out of the packaging cap and enveloped in a flange.

6. The pluggable miniature optical passive device according to claim 1, further comprising a gap between the second end of the first ceramic ferrule and the lens.

7. The pluggable miniature optical passive device according to claim 6, wherein a size of the gap is between 0.15 millimeter and 0.2 millimeter.

8. The pluggable miniature optical passive device according to claim 6, wherein no optical fiber is located in the gap.

9. The pluggable miniature optical passive device according to claim 1, further comprising a spring provided in the casing, a first end of the spring abutting against an end face of the stopping piece, a second end of the spring abutting against a shoulder portion of an inner wall of the casing.

10. The pluggable miniature optical passive device according to claim 9, the casing comprising a first connector plug outer housing which envelopes the first ceramic ferrule and a jumper assembly which envelopes the optical device, the stopping piece being mounted in the first connector plug outer housing, the spring being mounted in the first connector plug outer housing and the jumper assembly.

11. The pluggable miniature optical passive device according to claim 10, the casing further comprising a protective tail sleeve positioned at a side of the jumper assembly away from the first connector plug outer housing, a second end of the optical fiber passing through the protective tail sleeve and extending out of the casing.

12. A pluggable optical passive device, comprising: a casing;
    an optical device mounted in the casing, the optical device including:
        a ferrule located at a first end of the optical device,
        at least one fiber core located in the ferrule that each receive incoming light from a same direction,
        a first end of the ferrule extending out of the casing,
        a second end of the ferrule a positioned in the optical device, the second end of the ferrule being coated with an antireflection film;

a lens located in the optical device between the second end of the ferrule and a plurality of optical fibers extending from a second end of the optical device;

each of the plurality of optical fibers including a first end located adjacent an optical-fiber-side face of the lens; and a wavelength division multiplexing film located on a face of the lens, the optical device implements a wavelength division multiplexer.

13. The pluggable optical passive device of claim 12, further comprising a gap between the second end of the ferrule and the lens.

14. The pluggable optical passive device of claim 13, wherein no optical fiber is located in the gap.

15. The pluggable optical passive device of claim 13, wherein a size of the gap is between 0.15 millimeter and 0.2 millimeter.

16. The pluggable optical passive device of claim 12, further comprising a stopping piece having a penetrating hole, the ferrule passing through the stopping piece.

17. The pluggable optical passive device of claim 16, further comprising a spring provided in the casing, a first end of the spring abutting against an end face of the stopping piece, a second end of the spring abutting against a shoulder portion of an inner wall of the casing.

18. The pluggable optical passive device of claim 12, wherein a ferrule-side face of the lens is oblique relative to an end face of the second end of the ferrule.

19. The pluggable optical passive device of claim 12, the at least one fiber core including at least two fiber cores, the plurality of optical fibers including at least three optical fibers.

20. The pluggable optical passive device of claim 12, the at least one fiber core including one fiber core.

* * * * *